(12) United States Patent
Kato

(10) Patent No.: US 6,940,901 B2
(45) Date of Patent: Sep. 6, 2005

(54) APPARATUS AND METHOD FOR INFORMATION PROCESSING

(75) Inventor: Motoki Kato, Kanagawa (JP)

(73) Assignee: Sony Corporation (JP)

( * ) Notice: Subject to any disclaimer, the term of this patent is extended or adjusted under 35 U.S.C. 154(b) by 387 days.

(21) Appl. No.: 09/872,274

(22) Filed: Jun. 1, 2001

(65) Prior Publication Data

US 2002/0015529 A1 Feb. 7, 2002

(30) Foreign Application Priority Data

Jun. 2, 2000 (JP) .................................. P2000-165298
Jan. 9, 2001 (JP) .................................. P2001-001030

(51) Int. Cl.⁷ .................................................. H04N 7/12
(52) U.S. Cl. .............................................. 375/240.01
(58) Field of Search .................... 348/423.1, 423, 348/390, 384, 385, 400, 404.1, 425.1, 699; 375/240.27, 240.26, 240.28, 240.01, 240.04, 240.05, 240.14, 240.07; 382/238, 234, 232, 236

(56) References Cited

U.S. PATENT DOCUMENTS

| | | | | |
|---|---|---|---|---|
| 5,617,145 A | * | 4/1997 | Huang et al. ................ | 348/423 |
| 5,889,921 A | * | 3/1999 | Sugiyama et al. ............ | 386/98 |
| 6,041,068 A | | 3/2000 | Rosengren et al. | |
| 6,055,270 A | | 4/2000 | Ozkan et al. | |
| 6,167,084 A | * | 12/2000 | Wang et al. ........... | 375/240.02 |
| 6,181,711 B1 | * | 1/2001 | Zhang et al. ............... | 370/468 |
| 6,483,543 B1 | * | 11/2002 | Zhang et al. ............... | 348/390 |
| 6,526,097 B1 | * | 2/2003 | Sethuraman et al. ..... | 375/240.2 |
| 6,577,682 B1 | * | 6/2003 | Brightwell et al. .... | 375/240.24 |

FOREIGN PATENT DOCUMENTS

| | | |
|---|---|---|
| EP | 0 915 623 A1 | 5/1999 |
| EP | 0 975 116 A2 | 1/2000 |
| GB | 2 327 548 A1 | 1/1999 |

* cited by examiner

Primary Examiner—Chris Kelley
Assistant Examiner—Behrooz Senfi
(74) Attorney, Agent, or Firm—Lerner, David, Littenberg, Krumholz & Mentlik, LLP

(57) ABSTRACT

When the bit rate of an input transport stream is reduced to a lower bit rate S by reencoding, the bit rate Ro of streams other than video is set to be the same as the bit rate of the streams other than video in the input transport stream. Then, the value obtained by subtracting Ro from S (S−Ro) is set as the bit rate for the video stream to be reencoded.

21 Claims, 15 Drawing Sheets

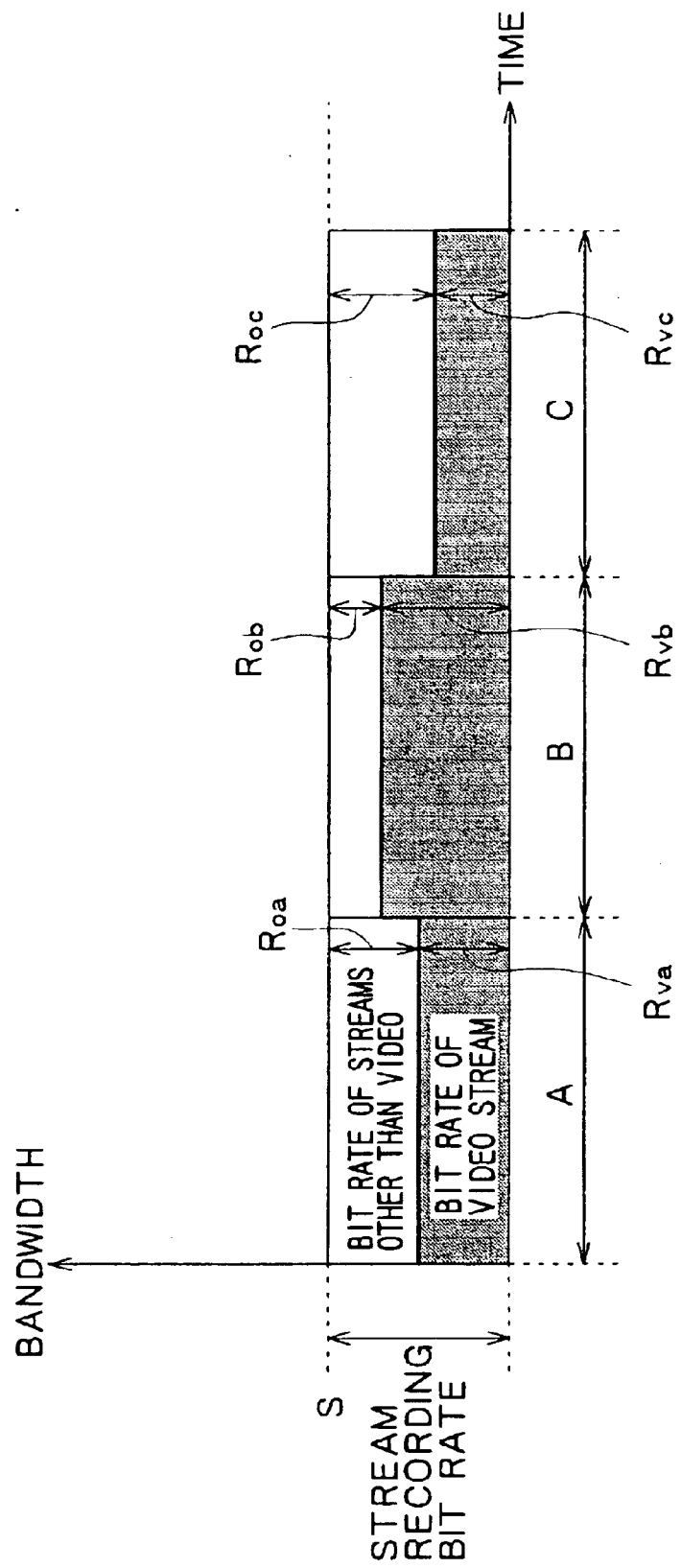

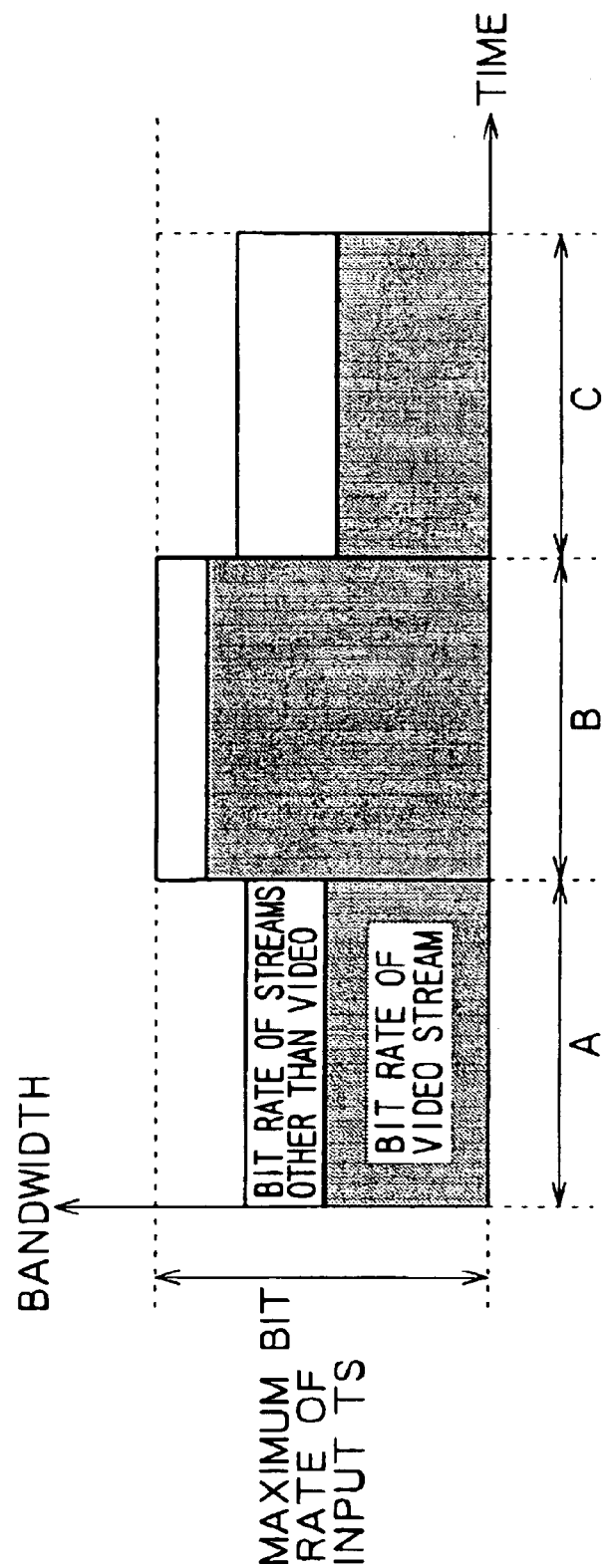

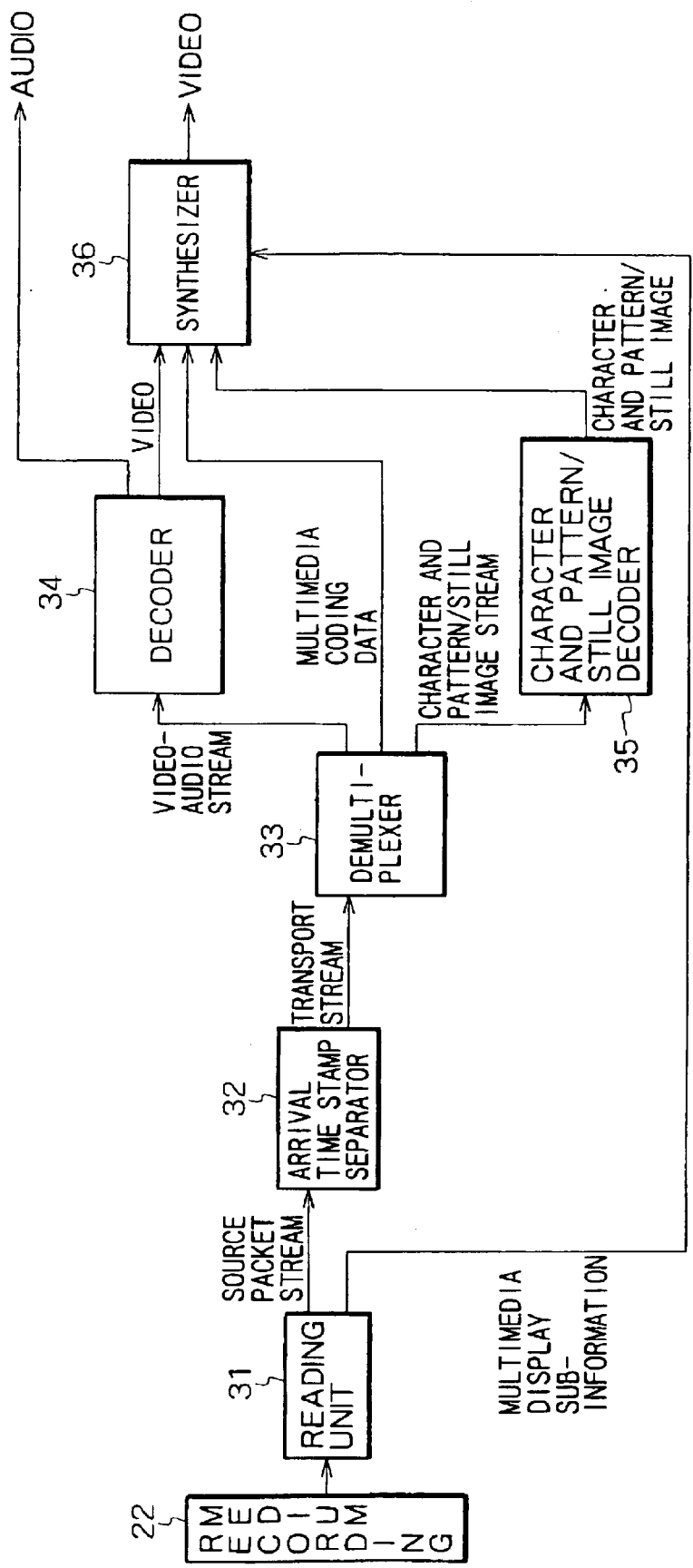

RECEIVING SIDE (REPRODUCING SIDE)

TRANSMITTING SIDE (RECORDING SIDE)

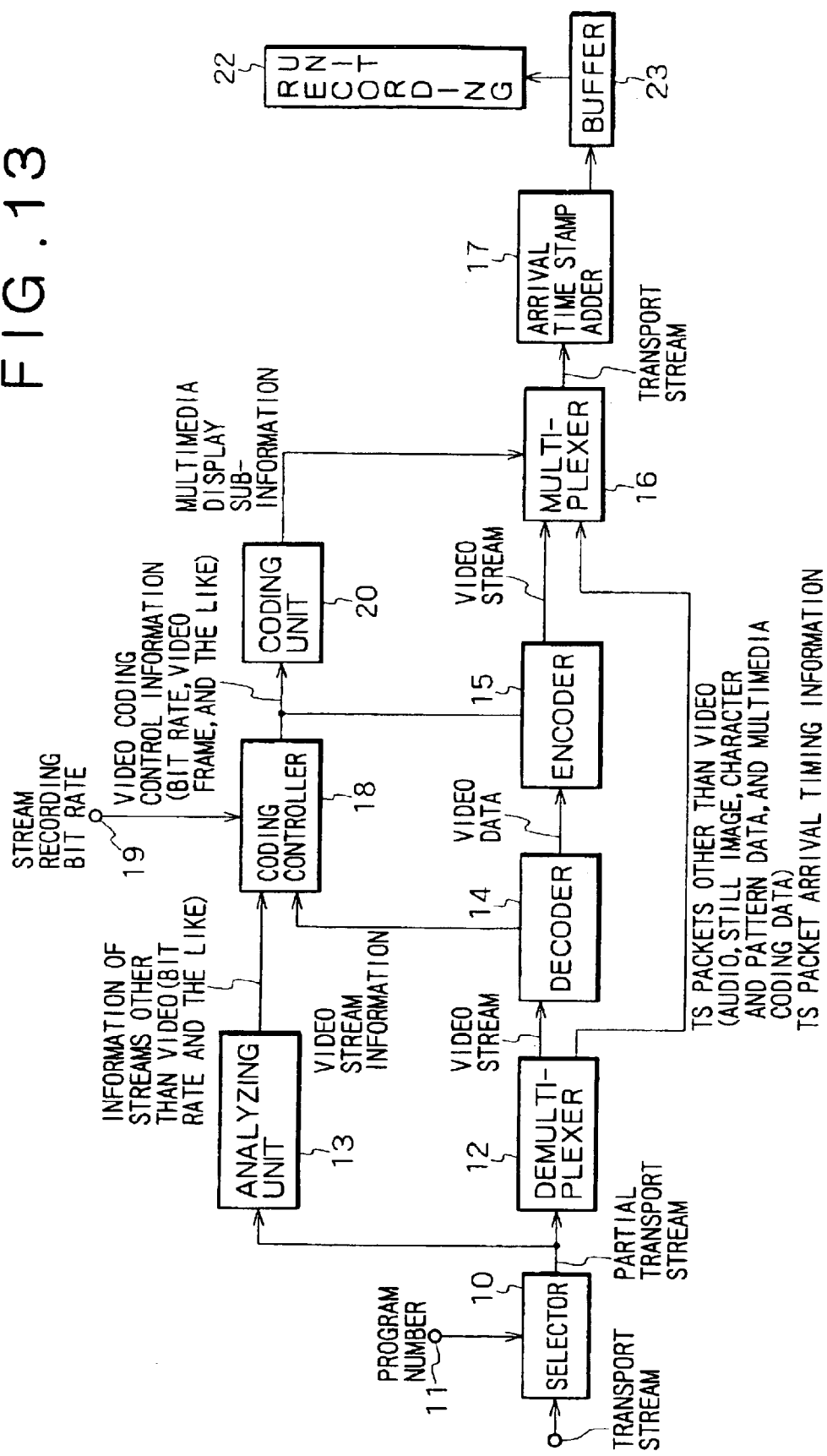

APPARATUS AND METHOD FOR INFORMATION PROCESSING

CROSS-REFERENCE TO RELATED APPLICATIONS

The present application claims priority from Japanese Application Nos. P2000-165298 filed Jun. 2, 2000 and P2001-001030 filed Jan. 9, 2001, the disclosures of which are hereby incorporated by reference herein.

BACKGROUND OF THE INVENTION

The present invention relates to an apparatus and a method for information processing and a recording medium, and particularly to an apparatus and a method for information processing and a recording medium that can reencode video data more efficiently.

Digital television broadcasts such as DVB (Digital Video Broadcast) in Europe, DTV (Digital Television) broadcast in the U.S., and BS (Broadcast Satellite) digital broadcast in Japan use an MPEG (Motion Picture Expert Group) 2 transport stream. The transport stream is formed by a series of transport packets. The transport packet is packetized video data or audio data, for example. Data length of a single transport packet is 188 bytes.

Digital television broadcasts are different from analog television broadcasts in that a digital television broadcast can provide service with multimedia coding data. This service associates video data, audio data, character and pattern data, still image data, and other data with each other by the multimedia coding data and transmits the data. In the case of the BS digital broadcast of Japan, for example, an XML (Extensible Markup Language)-based coding method is used for the multimedia coding data. Details of this method are disclosed in ARIB STD-B24 Data Coding and Transmission Specification for Digital Broadcasting, for example.

Video data, audio data, character and pattern data, still image data, and other data are transmitted as transport packets.

If a television program transmitted as a so-called transport stream in a digital television broadcast is recorded as it is received, it is possible to record the television program without degrading its image quality and sound quality. In some cases, however, it is desired to record as long a television program as possible on a recording medium having a limited capacity, even if its image quality, for example, is somewhat degraded. In such cases, a video stream may be reencoded to lower its bit rate, for example.

The bit rates of the video stream and other streams may be lowered at the same rate. For example, when the bit rate of an input transport stream is lowered to ½ for output, the bit rate of its video stream is lowered to ½, and also the bit rate of streams other than the video stream is lowered to ½. As a result, a stream other than the video stream with a relatively low data volume, in particular, for example, an audio stream, is greatly affected, which results in great degradation in sound quality.

SUMMARY OF THE INVENTION

It is an object of the present invention to prevent great degradation of a stream other than the video stream.

To achieve the above object, according to a first aspect of the present invention, there is provided an information processing apparatus which includes a separating unit operable to separate an input multiplexed stream into a first stream of first stream information and a second stream of stream information other than the first stream information; a setting unit operable to set a bit rate of an output multiplexed stream; a controller operable to control coding conditions for reencoding the first stream on the basis of a bit rate of the second stream and the bit rate of the output multiplexed stream; a coding unit operable to reencode the first stream under the coding conditions; and a multiplexing unit operable to multiplex the reencoded first stream and the second stream to produce the output multiplexed stream.

With this configuration, the first stream is a video stream, and the controller is operable to control the coding conditions by determining a bit rate difference between the bit rate of the output multiplexed stream and the bit rate of the second stream, and setting the bit rate difference as a bit rate assigned to the first stream at the time of reencoding.

The coding conditions may include at least one of the bit rate difference and a video frame.

The controller may control the coding conditions also on the basis of the first stream information.

To achieve the above object, according to a second aspect of the present invention, there is provided a method for reencoding an input multiplexed stream to provide an output multiplexed stream. The method includes separating the input multiplexed stream into a first stream of first stream information and a second stream of stream information other than the first stream information; setting a bit rate of the output multiplexed stream; controlling coding conditions for reencoding the first stream on the basis of a bit rate of the second stream and the bit rate of the output multiplexed stream; reencoding the first stream under the coding conditions; and multiplexing the reencoded first stream and the second stream to produce the output multiplexed stream.

To achieve the above object, according to a third aspect of the present invention, there is provided a recording medium recorded with a program for reencoding an input multiplexed stream to provide an output multiplexed stream. The program includes separating the input multiplexed stream into a first stream of first stream information and a second stream of stream information other than the first stream information; setting a bit rate of the output multiplexed stream; controlling coding conditions for reencoding the first stream on the basis of a bit rate of the second stream and the bit rate of the output multiplexed stream; reencoding the first stream under the coding conditions; and multiplexing the reencoded first stream and the second stream to produce the output multiplexed stream.

With this configuration, the apparatus and the method for information processing and the program on a recording medium according to the present invention may control the coding conditions for reencoding the first stream on the basis of the stream information of the second stream and the bit rate of the output multiplexed stream.

BRIEF DESCRIPTION OF THE DRAWINGS

FIG. 9 shows another transport stream after reencoding of the video stream;

FIG. 10 is a schematic diagram showing another input transport stream;

FIG. 11 is a block diagram showing an embodiment of a reproducing apparatus to which the present invention is applied;

FIG. 13 is a block diagram showing another configuration of a recording apparatus to which the present invention is applied;

DETAILED DESCRIPTION OF PREFERRED EMBODIMENTS

Figure 1:
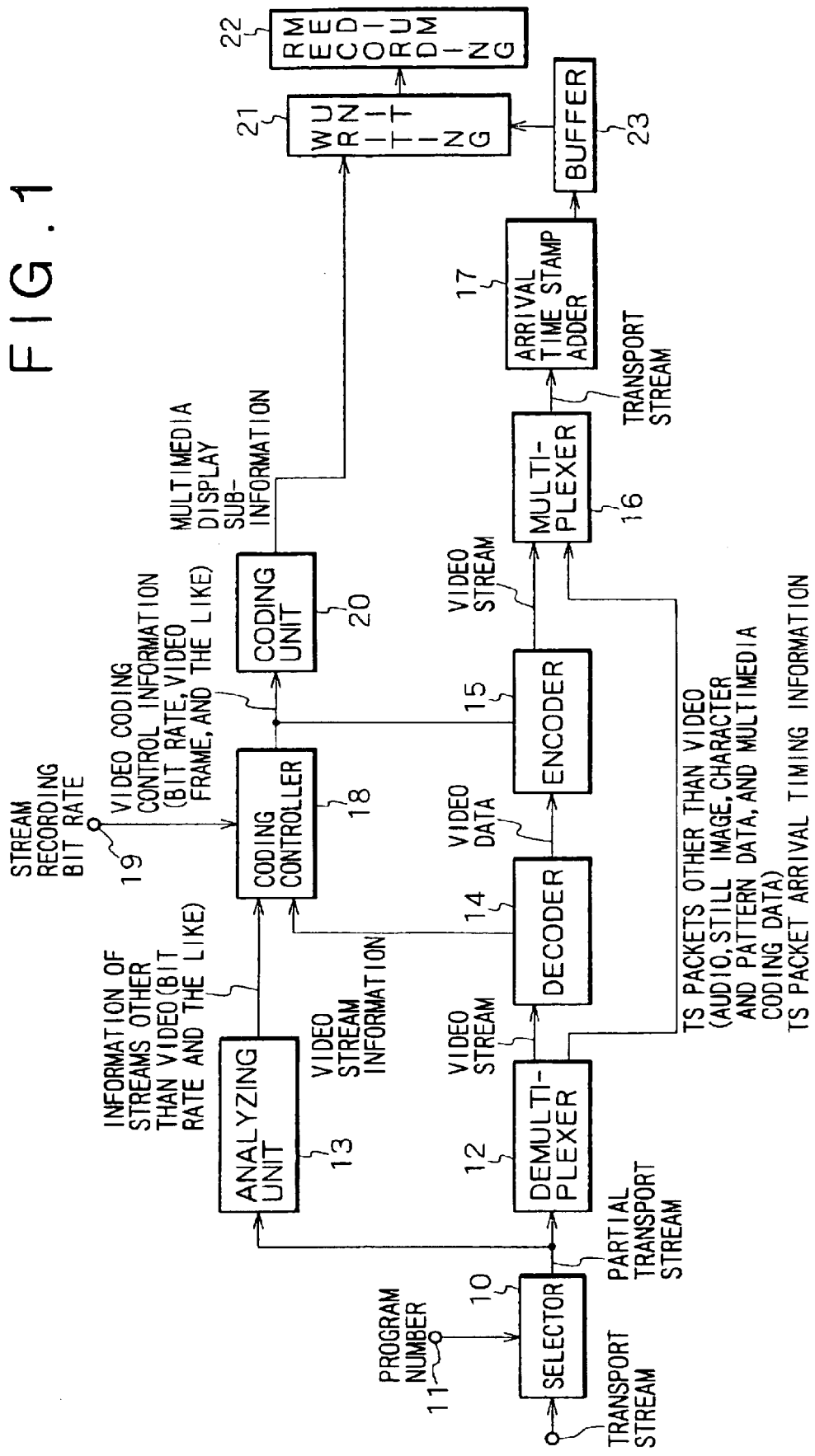
FIG. 1 is a block diagram showing an embodiment of a recording apparatus to which the present invention is applied.

Preferred embodiments of the present invention will hereinafter be described with reference to the drawings. FIG. 1 is a configuration diagram showing an embodiment of a recording apparatus 1 to which the present invention is applied. A transport stream received by an antenna or the like (not shown) is input to a selector 10. The selector 10 is also supplied with a program number (channel number) specified by the user from a terminal 11. The selector 10 extracts a specified program from the input transport stream on the basis of the program number and then outputs a partial transport stream. The partial transport stream is input to a demultiplexer 12 and an analyzing unit 13.

The transport stream input to the demultiplexer 12 is separated into a video stream and another stream (a stream comprising audio, a still image, character and pattern data, multimedia encoding data, and other data). The separated video stream is output to a decoder 14. The other stream is output to a multiplexer 16. The demultiplexer 12 outputs to the multiplexer 16 not only transport packets other than video, but also information on output timing of the transport packets in the input transport stream.

The decoder 14 decodes the input video stream by a specified decoding method, for example, the MPEG2 method, and then outputs resulting video data to an encoder 15. Also, the decoder 14 outputs stream information of the video stream obtained in the decoding processing to a coding controller 18.

In the meantime, the analyzing unit 13 obtains stream information, for example, bit rate information and the like of the streams other than video by analyzing the input transport stream, and then outputs the stream information to the coding controller 18. The coding controller 18 is supplied with the stream information of the streams other than video output from the analyzing unit 13, the video stream information output from the decoder 14, and a stream recording bit rate from a terminal 19. The coding controller 18 uses these pieces of data to set conditions for the encoding of the video data by the encoder 15, and then outputs the set conditions (coding control information) to the encoder 15 and a coding unit 20.

The coding controller 18 sets a value obtained, for example, by subtracting a total value of bit rates of the streams other than video (data input from the analyzing unit 13) from the stream recording bit rate (data input from a controller, not shown, for controlling operation of the recording apparatus 1 via the terminal 19) as a bit rate assigned to the encoding of the video data. The coding controller 18 sets bit rate, video frame, and other coding control information so as to attain optimum image quality at the set bit rate, and then outputs the set coding control information to the encoder 15 and the coding unit 20. The coding control information will be described later in detail with reference to FIGS. 5 to 10.

Incidentally, when recoding is to be made on a recording medium at a fixed rate, the stream recording bit rate is the fixed rate, and when recoding is to be made at a variable bit rate, the stream recording bit rate is an average bit rate per predetermined time. However, it is necessary that a maximum value of the variable bit rate in this case not be higher than a maximum recording bit rate guaranteed by the recording medium.

The encoder 15 encodes the video data output from the decoder 14 according to the coding control information output from the coding controller 18 (for example, encodes the video data by the MPEG2 method), and outputs the resulting data to the multiplexer 16. The multiplexer 16 is supplied with the video stream from the encoder 15 as well as the transport stream packets other than video and the information on arrival timing of the transport stream packets from the demultiplexer 12. The multiplexer 16 multiplexes the video stream and the transport stream packets other than video according to the arrival timing information, and then outputs the result to an arrival time stamp adder 17 as a transport stream.

Figure 2:
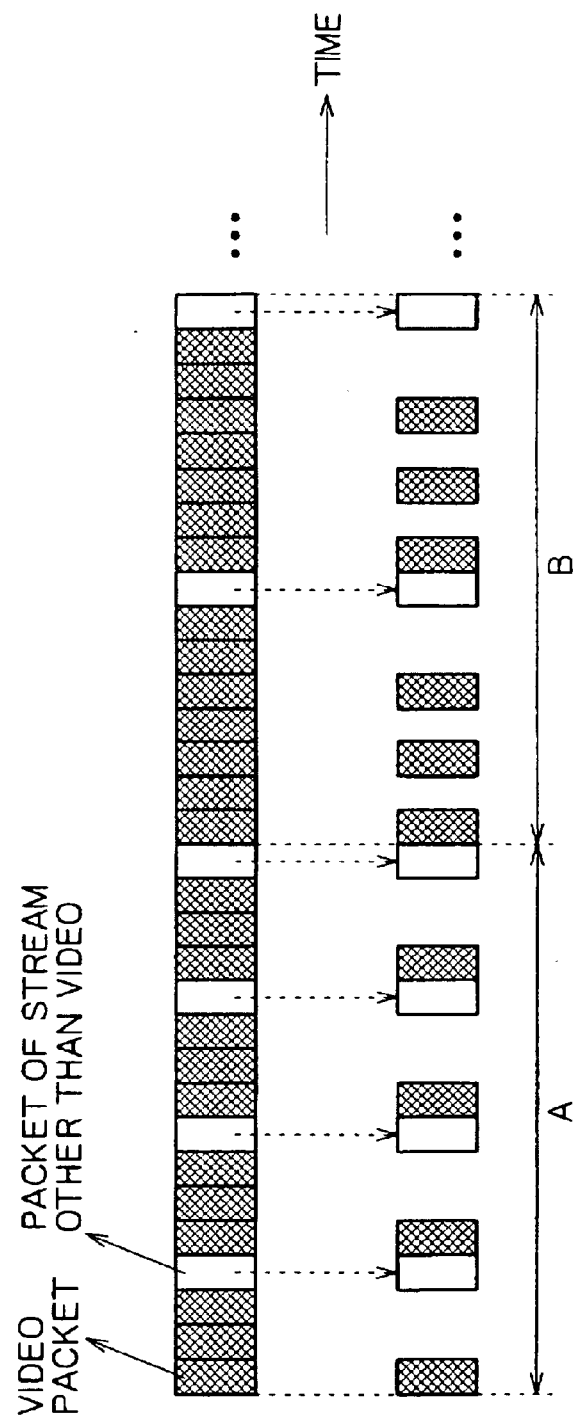
FIGS. 2A and 2B are schematic diagrams explaining the operation of a multiplexer shown in FIG. 1.

FIGS. 2A and 2B schematically illustrate this processing performed by the multiplexer 16. FIG. 2A illustrates the timing of the input transport stream packets. In FIG. 2A, a gray part represents a video packet, while a white part represents a stream packet other than video. As shown in FIG. 2A, the input transport stream packets are continuous. The encoder 15 reencodes the video data, whereby the amount of the video data is reduced. As a result, the number of video packets is reduced.

As shown in FIG. 2B, the multiplexer 16 does not change the timing of the stream packets other than video, and changes only the timing of the video packets from an original state (state shown in FIG. 2A).

Figure 3:
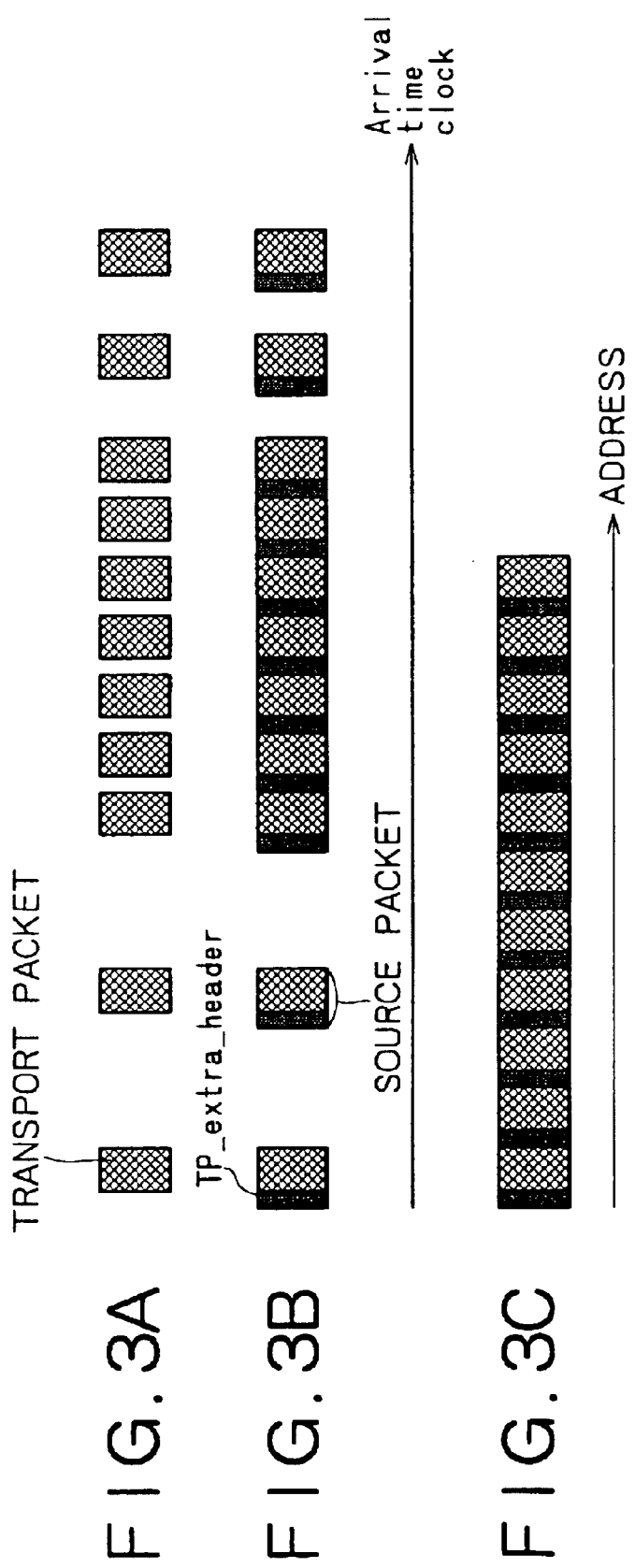
FIGS. 3A, 3B, and 3C are schematic diagrams explaining the processing of an arrival time stamp adder shown in FIG. 1.

As shown in FIGS. 3A, 3B, and 3C, the arrival time stamp adder 17 adds a header (TP_extra_header) including an arrival time stamp to each transport stream packet (FIG. 3A) of the input transport stream to thereby produce a source packet (FIG. 3B). The arrival time stamp adder 17 arranges source packets in a continuous manner (FIG. 3C), and then outputs the source packets to a writing unit 21. The arrival time stamp is information indicating timing of arrival of the transport stream packets in the transport stream. The writing unit 21 files the source packet stream formed by the input continuous source packets, and then records the source packet stream on a recording medium 22. Incidentally, any medium may be used as the recording medium 22.

The writing unit 21 is also supplied with information output from the coding unit 20. The coding unit 20 generates multimedia display sub-information on the basis of the video coding information from the coding controller 18, and then outputs the multimedia display sub-information to the writing unit 21. The multimedia display sub-information output to the writing unit 21 is intended to set a video display position and display size on a multimedia plane the same as those of a frame intended on the transmitting side (frame that would be displayed without the reencoding) when the video stream transcoded (decoded by the decoder 14 and thereafter encoded again by the encoder 15) has changed video frame size. The multimedia display sub-information is used in reproduction in combination with the multimedia coding data.

Figure 4:
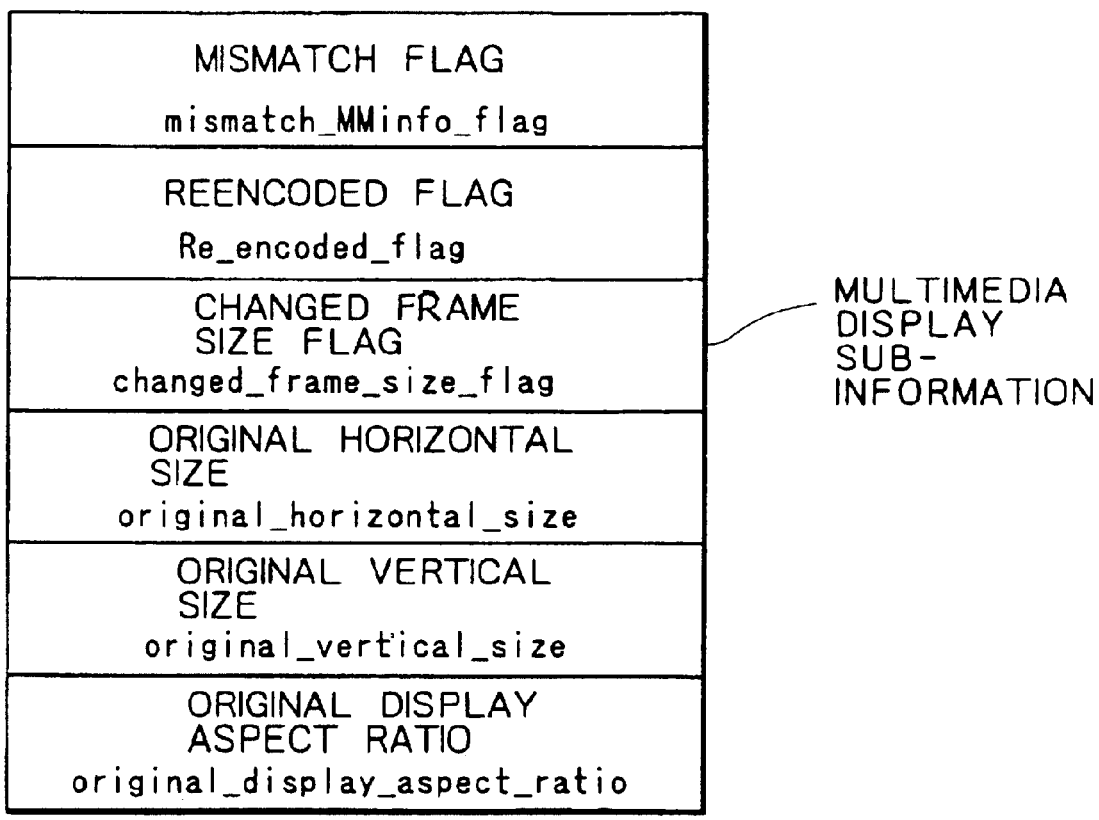
FIG. 4 is a diagram explaining multimedia display sub-information.

Specific description will now be made of the multimedia display sub-information. As shown in FIG. 4, the multimedia display sub-information comprises three flags: a mismatch flag (mismatch_MMinfo_flag), a reencoded flag (Re_encoded_flag), and a changed frame size flag (changed_frame_size_flag); data indicating two sizes: original horizontal size (original_horizontal_size) and original vertical size (original_vertical_size); and original display aspect ratio (original_display_aspect_ratio).

The mismatch flag indicates whether there is a mismatch between video and multimedia coding data. The reencoded flag indicates whether video is reencoded in recording or not. The changed frame size flag indicates whether a video frame is changed by reencoding, for example. The original horizontal size is the video frame size in a horizontal direction before reencoding. The original vertical size is the video frame size in a vertical direction before reencoding. The original display aspect ratio signifies the frame display aspect ratio before reencoding.

The multimedia display sub-information described above is a mere example; information other than that shown in FIG. 4 may be included, or part of the information shown in FIG. 4 may be removed as required.

The multimedia display sub-information created and output by the coding unit 20 is recorded on the recording medium 22 by the writing unit 21. The multimedia display sub-information is recorded as a separate file from the source packet stream file output from the arrival time stamp adder 17. When the writing unit 21 records the multimedia display sub-information on the recording medium 22 as a separate file from the source packet stream file, the coding unit 20 outputs the multimedia display sub-information from the file.

In the above description, the coding controller 18 generates coding control information including bit rate, video frame, and other information on the basis of input data. However, the following information may be generated as other coding control information: when the analyzing unit 13 analyzes the input transport stream and thereby determines that the input transport stream includes multimedia coding data, the coding controller 18 may generate coding control information for instructing the encoder 15 to reencode a video frame of the same size as an original video frame (video frame before reencoding), and output the coding control information to the encoder 15.

In such a case, the encoder 15 reencodes the video data from the decoder 14 at the same value as that of the video frame of the original video stream according to the input coding control information. When such coding control information is generated and reencoding is performed according to the coding control information, the video frame is not changed by reencoding, and therefore it is possible to prevent a mismatch between the video stream obtained by reencoding and the multimedia coding data.

An example of control based on the coding control information will next be described with reference to FIGS. 5 to 10.

Figure 5:
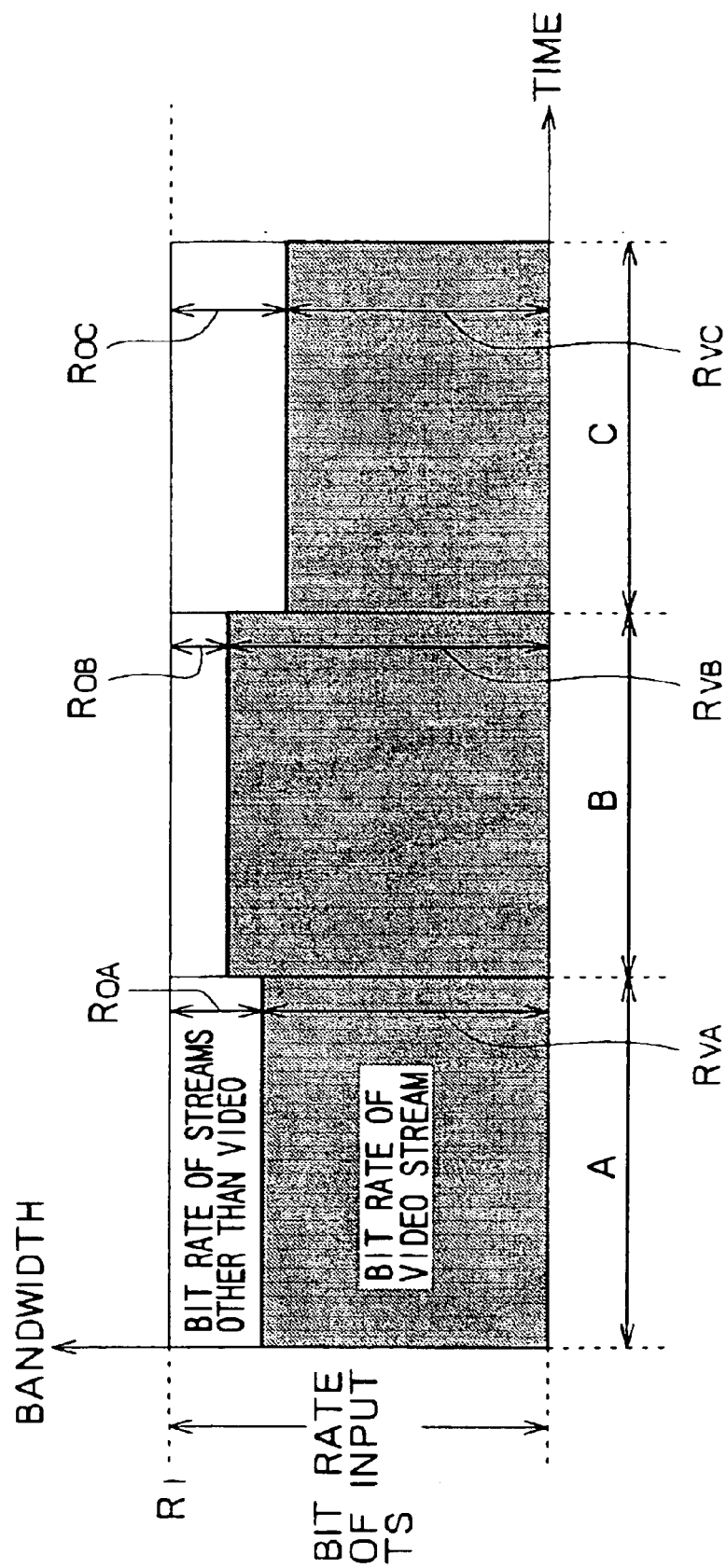
FIG. 5 is a schematic diagram explaining an input transport stream.

As shown in FIG. 5, suppose that a transport stream input to the selector 10 has a fixed bit rate RI. A video stream and a stream other than video are both coded at a variable bit rate. In the case of FIG. 5, the bit rate of the video stream is RVA at a unit time (for example, GOP) A, while the bit rate of the stream other than video at the unit time is ROA. At a unit time B, the bit rate of the video stream is RVB, and the bit rate of the stream other than video is ROB. At a unit time C, the bit rate of the video stream is RVC, and the bit rate of the stream other than video is ROC.

Figure 6:
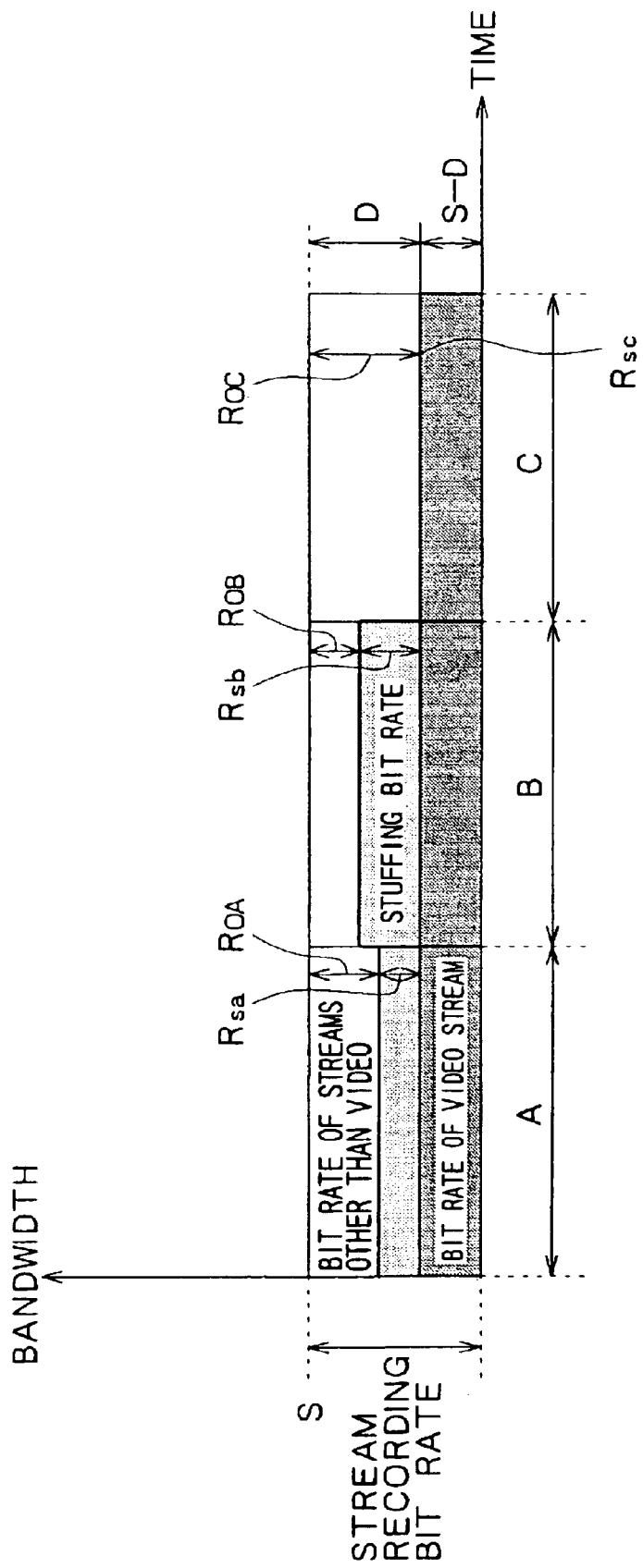
FIG. 6 shows a transport stream after reencoding of the video stream of FIG. 5.
Figure 7:
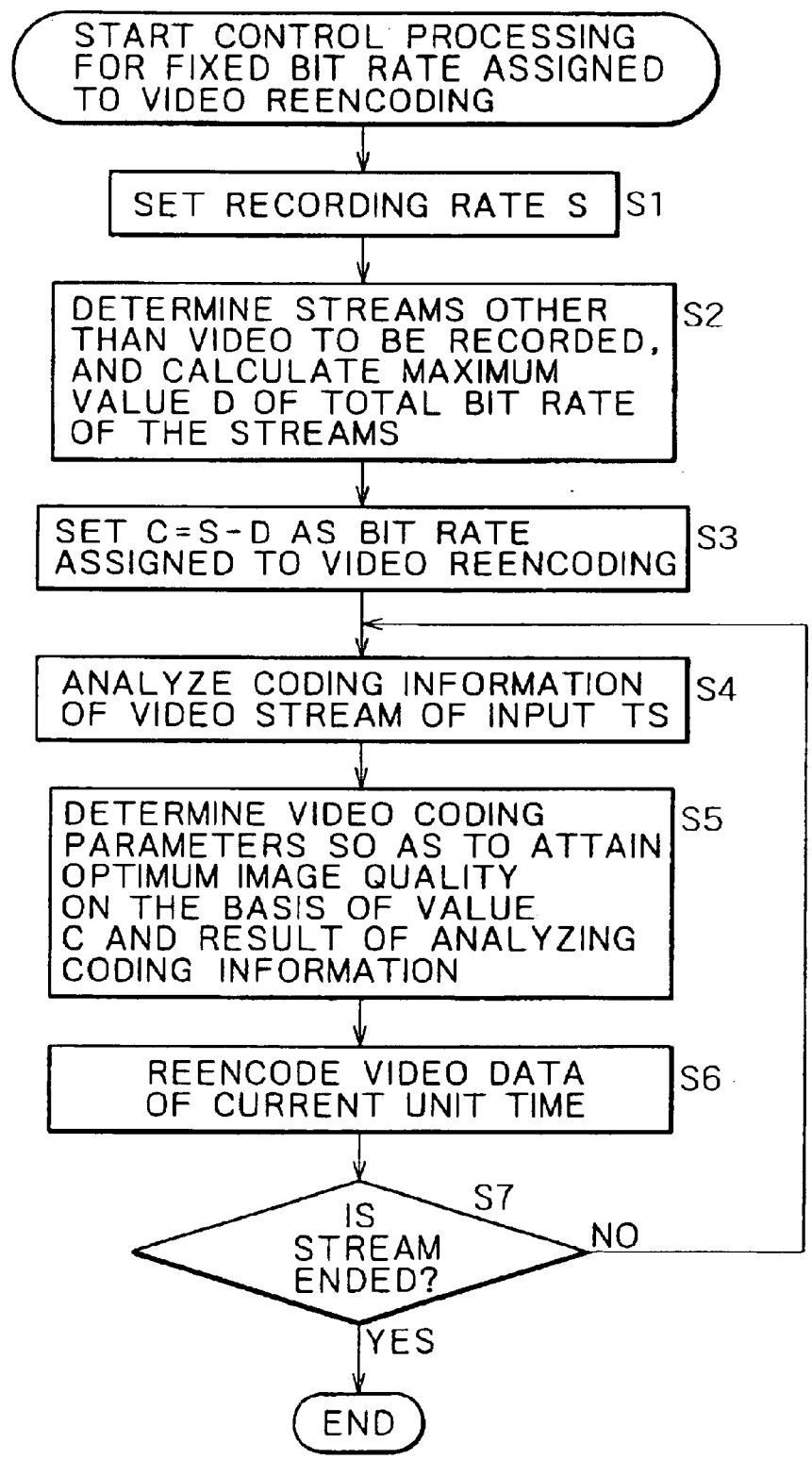
FIG. 7 is a flowchart explaining a recording rate control process of the recording apparatus of FIG. 1.

When the transport stream as shown in FIG. 5 is to be reencoded and output from the multiplexer 16 as a transport stream having a fixed bit rate S (S<RI), as shown in FIG. 6, the coding controller 18 carries out the processing illustrated in the flowchart of FIG. 7.

First, at a step S1, the coding controller 18 sets the bit rate (recording rate) of the transport stream to be output from the multiplexer 16 at S according to a control signal input from the terminal 19 by the controller not shown in the figure. Next, at a step S2, the coding controller 18 determines streams other than video to be recorded, and calculates a maximum value D of total bit rate of the streams.

The maximum value D is determined from stream specifications of the input transport stream. For example, according to stream specifications of digital BS broadcast in Japan, the maximum value of bit rate of a single audio stream is 384 Kbps, and hence when two audio streams are to be recorded in addition to video, the maximum value D is 384×2 Kbps.

Next, at a step S3, the coding controller 18 subtracts the maximum value D calculated at the step S2 from the recording bit rate S set at the step S1, and then sets an obtained value C (=S−D) as a bit rate assigned to the reencoding of the video data. At a step S4, the coding controller 18 analyzes bit rate, video frame, and other coding information of the video stream by referring to the video stream information output from the decoder 14.

At the next step S5, the coding controller 18 determines video coding parameters (video coding control information) so as to attain optimum image quality on the basis of the value C calculated at the step S3 and the coding information of the video stream analyzed at the step S4.

In the example shown in FIG. 6, the value S is ½ of the value RI. In this case, the bit rate of the streams other than video has the maximum value D, and the maximum value D is used as it is as the bit rate of streams other than video of a multiplexed stream after reencoding.

Then, video coding parameters are determined so as to attain optimum image quality within a range of (S−D). When a video frame is controlled, a video frame of 720×480 pixels, for example, is subsampled in a horizontal direction to reduce the pixels to ½, that is, 360×480 pixels. The determined coding parameters (bit rate, video frame and the like) are supplied to the encoder 15 as video coding control information.

At a step S6, the encoder 15 reencodes video data to be processed at the unit time (unit time A in this case) according to the video coding control information supplied from the coding controller 18. In the example of FIG. 6, although the bit rate ROA in the unit time A is actually lower than the maximum value D, the bit rate assigned to video is (S−D) because the maximum value D is a fixed value. Since the maximum value D is fixed, there is a wasted portion Rsa that cannot be used for video encoding. Stuffing bits are inserted in the portion Rsa.

At the next step S7, the coding controller 18 determines whether the stream to be reencoded has ended. If the stream has not yet ended, the processing returns to the step S4 to repeat the processes from the step S4 down. When the coding controller 18 determines that the stream to be encoded has ended at the step S7, the processing ends.

Thus, also in the unit time B in the example of FIG. 6, the bit rate of the streams other than video is D, while the bit rate assigned to the video stream is a fixed bit rate, and hence S−D. Stuffing bits are inserted in a portion corresponding to a value Rsb (=S−(S−D)−ROB=D−ROB).

Also in the unit time C, the bit rate of the streams other than video is D, while the bit rate assigned to the video stream is S−D. In the unit time C, D=ROC and thus there are no stuffing bits.

Thus, in the example of FIG. 6, the video stream is encoded at a fixed bit rate.

Figure 8:
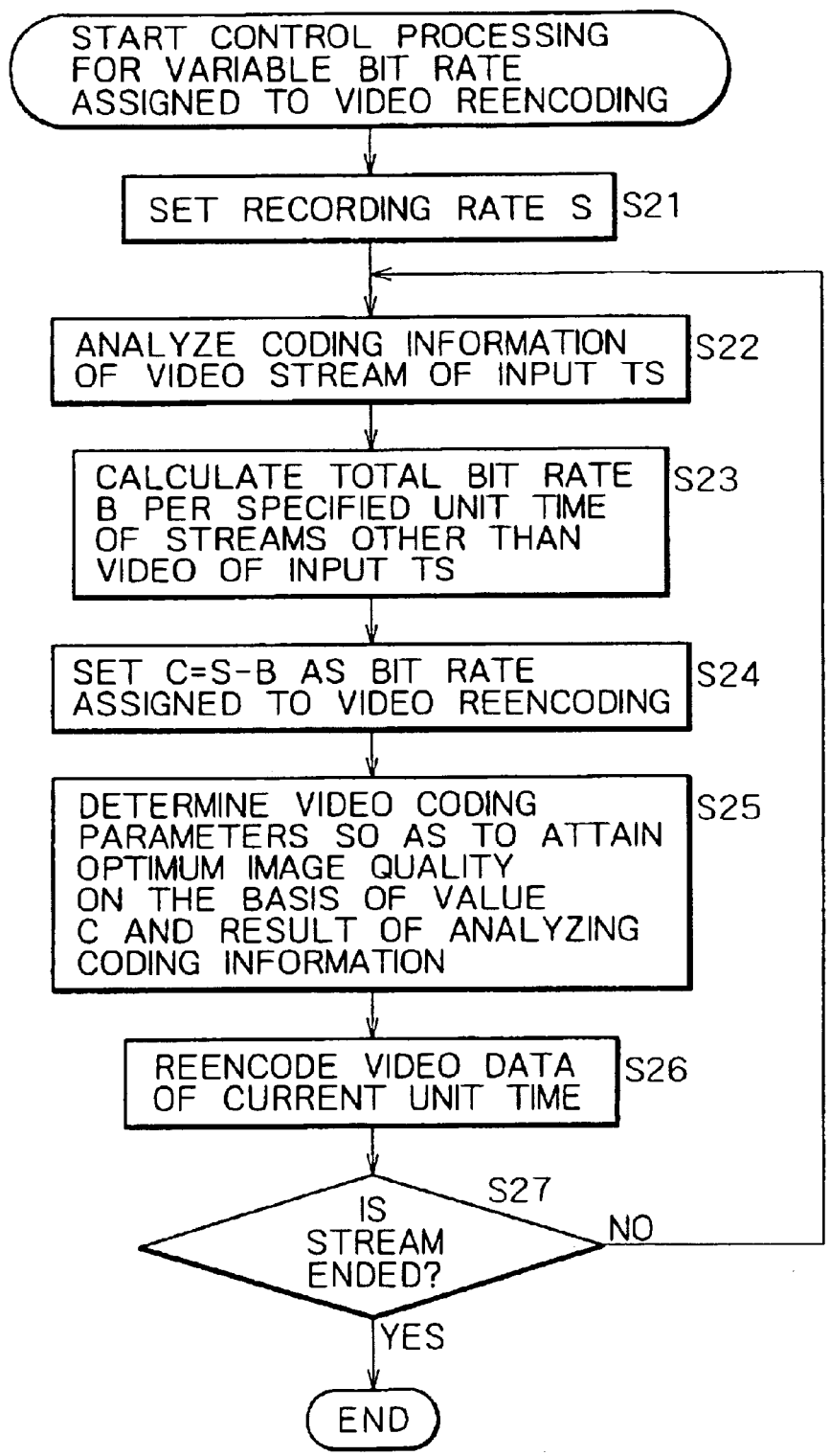
FIG. 8 is a flowchart explaining another recording rate control process of the recording apparatus of FIG. 1.

FIG. 8 illustrates an example of processing when the bit rate assigned to video reencoding is a variable bit rate. First, at a step S21, the coding controller 18 sets a recording rate S according to an input from the terminal 19. At the next step S22, the coding controller 18 analyzes coding information of the video stream on the basis of the video stream information output from the decoder 14. The processing of the steps S21 and S22 is the same as that of the steps S1 and S4 in FIG. 7.

At the next step S23, the coding controller 18 calculates a total bit rate B per unit time of the streams other than video from an output of the analyzing unit 13.

At the next step S24, the coding controller 18 subtracts the value B calculated by the processing of the step S23 from the value S set at the step S21, and then sets an obtained value C (=S−B) as a bit rate assigned to video reencoding.

Then, at a step S25, the coding controller 18 determines video coding parameters so as to attain optimum image quality on the basis of the value C obtained at the step S24 and a result of analyzing the coding information of the video stream at the step S22. The determined coding parameters are output to the encoder 15.

At a step S26, the encoder 15 reencodes video data of a current unit time on the basis of the coding parameters determined by the processing of the step S25. Thus, as shown in FIG. 9, for example, Roa (=ROA) is reserved as the unit-time bit rate of the streams other than video, and then a bit rate Rva defined as (S−Roa) is set as the bit rate of the video stream.

At a step S27, the coding controller 18 determines whether the stream has ended. If the stream has not ended, the processing returns to the step S22 to repeat the processes from the step S22 down. If the coding controller 18 determines that the stream has ended at the step S27, the processing ends.

Thus, in a unit time B, a bit rate Rob (=ROB) of the streams other than video is reserved, and then a remaining bit rate Rvb (=S−Rob) is set as the bit rate of the video stream. In a unit time C, Rvc (=S−Roc), obtained by subtracting a bit rate Roc of the streams other than video, is set as the bit rate of the video stream.

Thus, in this processing example, the video stream is reencoded at a variable bit rate, and therefore stuffing bits are not required or the amount of stuffing bits can be reduced. Hence, it is possible to encode the video stream more efficiently.

It is to be noted that the above description has been made by taking a case where the input transport stream has a fixed bit rate; however, the present invention may be applied to a case where the input transport stream has a variable bit rate, as shown in FIG. 10.

Thus, it is possible to record a transport stream of longer contents on the recording medium 22 at a lower bit rate as required.

In addition, it is possible to prevent significant degradation in quality of data other than video, such as audio data, still image/character and pattern data, and multimedia coding data. These pieces of data other than video are basically lower in volume than the video data. Therefore, reduction of the bit rate of the data other than video in the same ratio as that of the video data would affect the data other than video more than the video data. The present invention can prevent such effects.

Description will next be made of reproduction of a source packet stream file recorded on the recording medium 22. FIG. 11 is a block diagram showing an embodiment of a reproducing apparatus to which the present invention is applied. The source packet stream file recorded on the recording medium 22 is read by a reading unit 31. The reading unit 31 also reads multimedia display sub-information recorded on the recording medium 22 as a file separate from the source packet stream file.

The source packet stream read by the reading unit 31 is output to an arrival time stamp separator 32. The multimedia display sub-information is output to a synthesizer 36. The arrival time stamp separator 32 has a built-in reference clock to compare a value of the reference clock with a value of an arrival time stamp added to a source packet of the input source packet stream. When the two values become equal to each other, the arrival time stamp separator 32 removes the arrival time stamp having the equal value from the source packet including the arrival time stamp, and then outputs the source packet to a demultiplexer 33 as a transport stream packet.

The demultiplexer 33 separates the input transport stream into a video-audio stream, multimedia coding data, and a stream of character and pattern/character/still image and other data. The video-audio stream of the separated data is output to an AV decoder 34. The multimedia coding data is output to the synthesizer 36. The stream of character and pattern/character/still image and other data is output to a character and pattern/still image decoder 35.

The AV decoder 34 separates the input video-audio stream into video data and audio data, decodes the video data and the audio data, and then outputs the audio data to an audio reproducing apparatus (not shown) and the video data to the synthesizer 36. The character and pattern/still image decoder 35 decodes the input stream of character and pattern/character/still image and other data, and then outputs decoded character and pattern data, character data, still image data and the like to the synthesizer 36.

The synthesizer 36 is supplied with the video data from the AV decoder 34, the multimedia coding data output from the demultiplexer 33, the character and pattern/character/still image and other data output from the character and pattern/still image decoder 35, and the multimedia display sub-information read by the reading unit 31. The synthesizer 36 checks the mismatch flag (FIG. 4) of the input multimedia display sub-information to determine whether there is a mismatch between the input video signal and the multimedia coding data.

When the mismatch flag indicates that there is a mismatch between the input video signal and the multimedia coding data, the synthesizer 36 refers to the original horizontal size and original vertical size of the multimedia display sub-information to change the scale of the input video signal so that the video signal is reproduced with a frame of the size referred to. Then, a video signal obtained by combining the video signal changed in scale on the basis of the multimedia coding data with the other character and pattern data and the like on a multimedia plane is output to a television receiver (not shown) or the like serving as a display device.

On the other hand, when the mismatch flag of the multimedia display sub-information indicates that there is no mismatch between the input video signal and the multimedia coding data, the synthesizer 36 combines the input video signal with the other data on the multimedia plane for output without changing the scale of the input video signal.

Figure 12B:
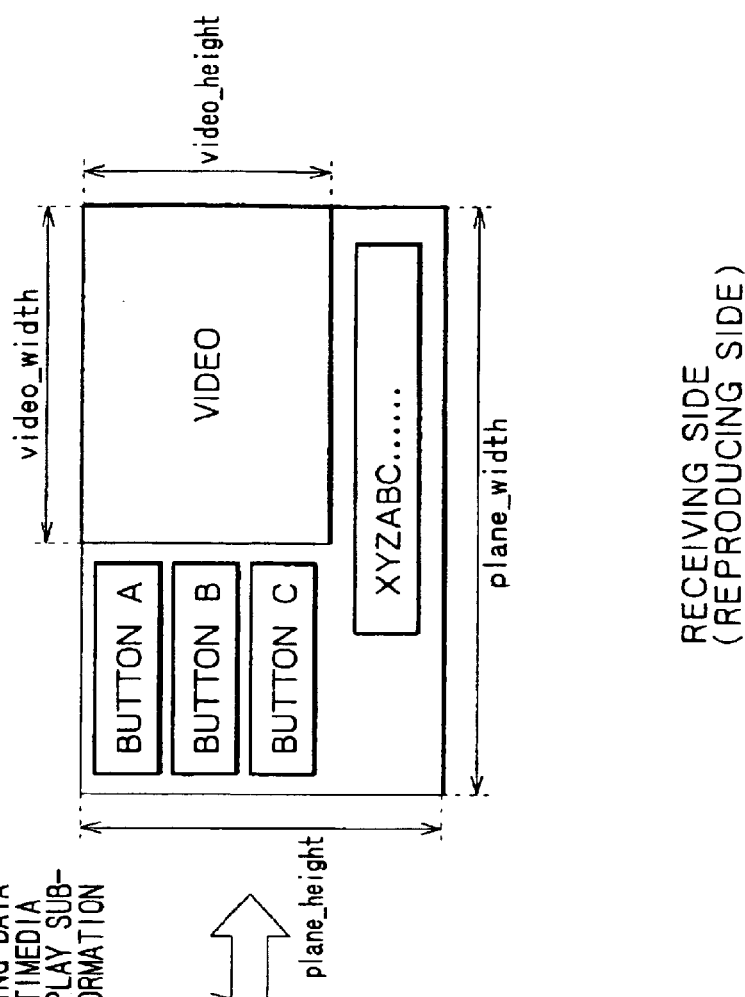
FIGS. 12A and 12B are explanatory diagrams showing a display screen when multimedia display sub-information is added.
Figure 12A:
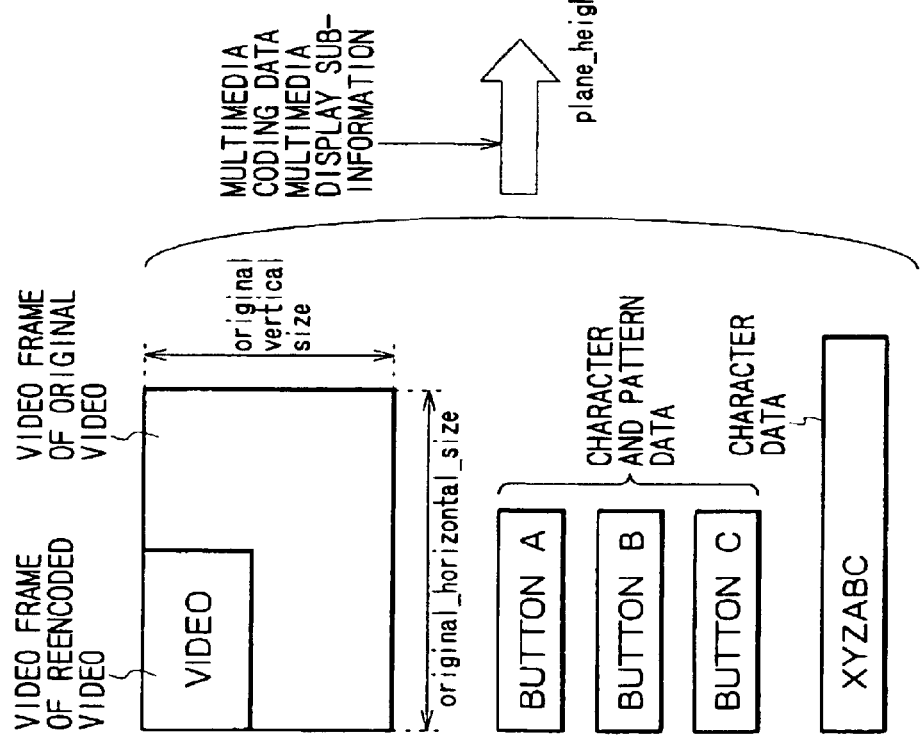

Thus, by recording the multimedia display sub-information in the recording operation and using the multimedia display sub-information during reproduction, a frame intended on the transmitting side is displayed on the receiving side. Referring to FIGS. 12A and 12B, even when a video frame is changed to a smaller size than that of an original video frame because of reencoding on the transmitting side (recording side), by recording the change in the video frame size as multimedia display sub-information and referring to the recorded multimedia display sub-information during reproduction, a frame that would be obtained without reencoding may be obtained on the receiving side (reproducing side) without a mismatch between the video and the other data.

While the multimedia display sub-information may be recorded on the recording medium 22 as a file separate from the source packet stream file including the character and pattern data and the video signal, as described above, the multimedia display sub-information may also be embedded in the source packet stream file to be recorded on the recording medium 22. FIG. 13 shows the configuration of a recording apparatus 1 for embedding multimedia display sub-information in a source packet stream file for recording.

As is clear from a comparison of the configuration of the recording apparatus 1 shown in FIG. 13 with that of the recording apparatus 1 shown in FIG. 1, multimedia display sub-information output from a coding unit 20 of the recording apparatus 1 of FIG. 13 is output to a multiplexer 16. The multiplexer 16 creates transport packets, then embeds the input multimedia display sub-information in a source packet stream file, and outputs the transport stream to an arrival time stamp adder 17. Instead of embedding the multimedia display sub-information in the source packet stream file as a transport packet, the multimedia display sub-information may be written in a user data area of an MPEG video stream.

It is to be noted that in the present embodiment, the method of reencoding video data is not limited to the foregoing method; the input video stream may be transformed on a DCT area to change a video frame and other coding parameters.

Figure 14:
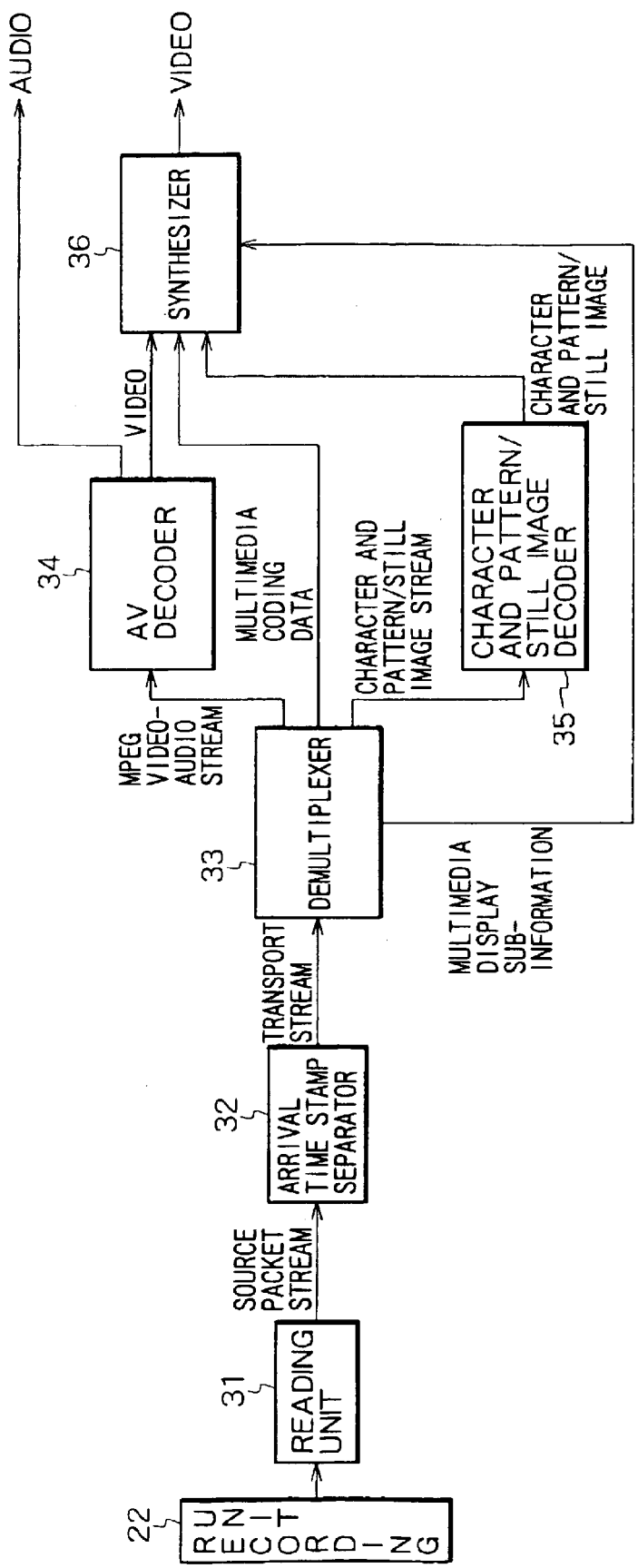
FIG. 14 is a block diagram showing another configuration of a reproducing apparatus to which the present invention is applied.

FIG. 14 shows the configuration of a reproducing apparatus 30 for the multimedia display sub-information thus embedded in the source packet stream file and recorded on the recording medium 22. As is clear from a comparison of the configuration of the reproducing apparatus 30 shown in FIG. 14 with that of the reproducing apparatus 30 shown in FIG. 11, a reading unit 31 in the configuration of the reproducing apparatus 30 of FIG. 14 reads only a source packet stream. The source packet stream read by the reading unit 31 is input to a demultiplexer 33 via an arrival time stamp separator 32.

The demultiplexer 33 extracts multimedia display sub-information from the input source packet stream file, and then outputs the multimedia display sub-information to a synthesizer 36. The remainder of the configuration is the same as in FIG. 11.

Thus, also in a case where the multimedia display sub-information is included in the source packet stream file for storage, a video frame size and a display position intended on the transmitting side are obtained on the receiving side.

It is to be noted that the description of the present embodiment has been made by taking the case of a transport stream; however, the present invention is not limited to this. The present invention is applicable to program streams and other multiplexed streams.

The series of processing steps described above may be carried out not only by hardware but also by software. In this case, a personal computer as shown in FIG. 15, for example, forms the recording apparatus 1 (and also the reproducing apparatus 30, though not shown in the figure).

Figure 15:
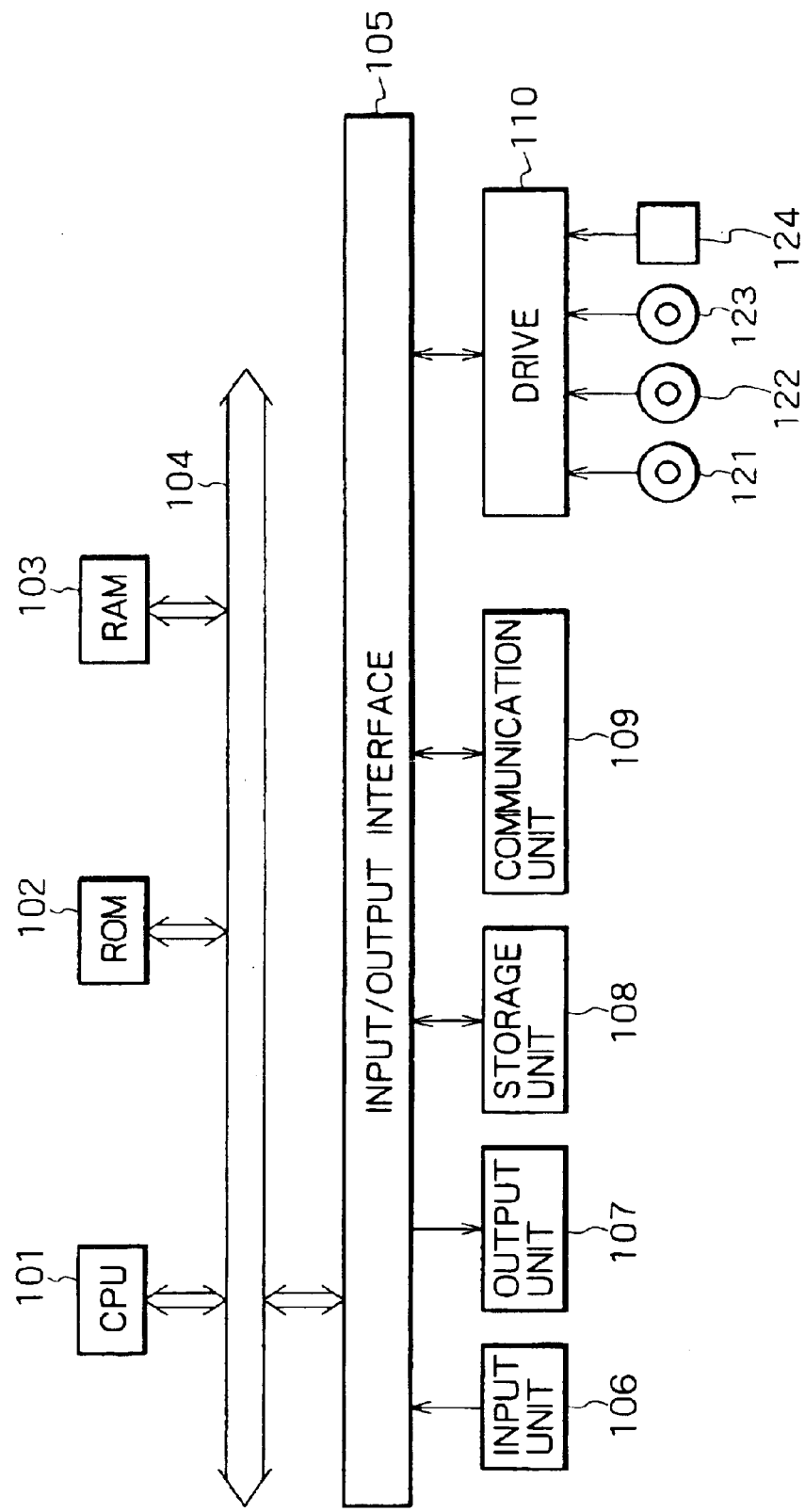
FIG. 15 is an explanatory diagram showing the configuration of a system for the input/output from a recording medium recorded with a program for carrying out the process of the present invention.

In FIG. 15, a CPU (Central Processing Unit) 101 carries out various processing according to a program stored in a ROM (Read Only Memory) 102 or a program loaded from a storage unit 108 into a RAM (Random Access Memory) 103. The RAM 103 also stores data and the like necessary for the CPU 101 to carry out various processing as required.

The CPU 101, the ROM 102, and the RAM 103 are connected to each other via a bus 104. Also, an input/output interface 105 is connected to the bus 104.

The input/output interface 105 is connected with an input unit 106 formed by a keyboard, a mouse and the like; an output unit 107 including a display formed by a CRT, an LCD or the like and a speaker; the storage unit 108 formed by a hard disk or the like; and a communication unit 109 formed by a modem, a terminal adapter and the like. The communication unit 109 carries out communication processing via a network.

The input/output interface 105 is also connected to a drive 110 as required. A magnetic disk 121, an optical disk 122, a magneto-optical disk 123, or a semiconductor memory 124 is inserted into the drive 110 as necessary. A computer program read from the drive 110 is installed in the storage unit 108 as required.

When the series of processing steps is to be carried out by software, a program is installed from a recording medium onto a computer where programs forming the software are incorporated in dedicated hardware, or a general-purpose personal computer that can perform various functions by installing various programs thereon, for example.

Examples of the recording medium include not only program-recorded package media distributed to users to provide a program separately from computers, such as a magnetic disk 121 (including a floppy disk), an optical disk 122 (including a CD-ROM (Compact Disk-Read Only Memory) and a DVD (Digital Versatile Disk)), a magneto-optical disk 123 (including an MD (Mini-Disk)), or a semiconductor memory 124, as shown in FIG. 15, but also a hard disk including a ROM 102 and a storage unit 109 storing a program and supplied to a user in a state of being preincorporated in a computer.

It is to be noted that in the present specification, the steps describing the program provided by the recording medium include not only processing steps carried out in time series in described order, but also processing steps carried out in parallel or individually and not necessarily in time series.

As described above, the apparatus and the method for information processing and the program provided on a recording medium according to the present invention control coding conditions for reencoding a first stream on the basis of the bit rate of a second stream and the bit rate of an output multiplexed stream. Therefore, it is possible to reencode the first stream without great degradation in quality of the second stream.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An information processing apparatus, comprising:
 a separating unit operable to separate an input multiplexed stream into a first stream comprised of video stream information and a second stream comprised of stream information other than the video stream information;
 a decoding unit operable to decode the first stream and to determine an input bit rate of the first stream;
 an analyzing unit operable to determine an input bit rate of the second stream;
 a setting unit operable to set a total bit rate of an output multiplexed stream;
 a controller operable to control coding conditions for reencoding the decoded first stream, the coding conditions including an output bit rate of the first stream that is determined on the basis of output bit rate of the second stream and the total bit rate of the output multiplexed stream, the output bit rate of the second stream being set to be identical to the input bit rate of the second stream;
 a coding unit operable to reencode the first stream under the coding conditions; and
 a multiplexing unit operable to multiplex the reencoded first stream and the second stream to produce the output multiplexed stream.

2. An information processing apparatus as claimed in claim 1, wherein said controller is operable to control the coding conditions by determining a bit rate difference between the total bit rate of the output multiplexed stream and the output bit rate of the second stream, the bit rate difference defining a maximum output bit rate of the reencoded first stream.

3. An information processing apparatus as claimed in claim 1, wherein the coding conditions include a video frame size.

4. An information processing apparatus as claimed in claim 1, wherein said controller is operable to control the coding conditions so as to reencode the first stream at a fixed output bit rate.

5. An information processing apparatus as claimed in claim 1, wherein said controller is operable to control the coding conditions so as to reencode the first stream at a variable output bit rate.

6. An information processing apparatus as claimed in claim 1, wherein the second stream includes information selected from the group consisting of audio information, still image information, character information, pattern information, and multimedia encoding information.

7. An information processing apparatus as claimed in claim 1, wherein said setting unit is operable to set the total bit rate of the output multiplexed stream at a variable bit rate.

8. A method for reencoding an input multiplexed stream to provide an output multiplexed stream, said method comprising:
 separating the input multiplexed stream into a first stream comprised of video stream information and a second stream comprised of stream information other than the video stream information;
 determining an input bit rate of the first stream;
 decoding the first stream;
 determining an input bit rate of the second stream;
 setting a total bit rate of the output multiplexed stream;
 controlling coding conditions for reencoding the decoded first stream, the coding conditions including an output bit rate of the first stream that is determined on the basis of an output bit rate of the second stream and the total bit rate of the output multiplexed stream, the output bit rate of the second stream being set to be identical to the input bit rate of the second stream;
 reencoding the first stream under the coding conditions; and
 multiplexing the reencoded first stream and the second stream to produce the output multiplexed stream.

9. A method as claimed in claim 8, wherein said controlling step controls the coding conditions by determining a bit rate difference between the total bit rate of the output multiplexed stream and the input bit rate of the second stream, the bit rate difference defining a maximum output bit rate of the reencoded first stream.

10. A method as claimed in claim 8, wherein the coding conditions include a video frame size.

11. A method as claimed in claim 8, wherein said controlling step controls the coding conditions so as to reencode the first stream at a fixed output bit rate.

12. A method as claimed in claim 8, wherein said controlling step controls the coding conditions so as to reencode the first stream at a variable output bit rate.

13. A method as claimed in claim 8, wherein the second stream information includes information selected from the group consisting of audio information, still image information, character information, pattern information, and multimedia encoding information.

14. A method as claimed in claim 8, wherein said setting step sets the total bit rate of the output multiplexed stream at a variable bit rate.

15. A recording medium recorded with a computer readable program for carrying out a method of reencoding an input multiplexed stream to provide an output multiplexed stream, said method comprising:
 separating the input multiplexed stream into a first stream comprised of video stream information and a second stream comprised of stream information other than the video stream information;
 determining an input bit rate of the first stream;
 decoding the first stream;
 determining an input bit rate of the second stream;
 setting a total bit rate of the output multiplexed stream;
 controlling coding conditions for reencoding the decoded first stream, the coding conditions including an output bit rate of the first stream that is determined on the basis of an output bit rate of the second stream and the total bit rate of the output multiplexed stream, the output bit rate of the second stream being set to be identical to the input bit rate of the second stream;
 reencoding the first stream under the coding conditions; and multiplexing the reencoded first stream and the second stream to produce the output multiplexed stream.

16. A recording medium as claimed in claim 15, wherein said controlling step controls the coding conditions by determining a bit rate difference between the total bit rate of the output multiplexed stream and the output bit rate of the second stream, the bit rate difference defining a maximum output bit rate of the reencoded first stream.

17. A recording medium as claimed in claim 15, wherein the coding conditions include a video frame size.

18. A recording medium as claimed in claim 15, wherein said controlling step controls the coding conditions so as to reencode the first stream at a fixed output bit rate.

19. A recording medium as claimed in claim 15, wherein said controlling step controls the coding conditions so as to reencode the first stream at a variable output bit rate.

20. A recording medium as claimed in claim 15, wherein the second stream includes information selected from the group consisting of audio information, still image information, character information, pattern information, and multimedia encoding information.

21. A recording medium as claimed in claim 15, wherein said setting step sets the total bit rate of the output multiplexed stream at a variable bit rate.

* * * * *

UNITED STATES PATENT AND TRADEMARK OFFICE
CERTIFICATE OF CORRECTION

PATENT NO.   : 6,940,901 B2
DATED        : September 6, 2005
INVENTOR(S)  : Motoki Kato It is certified that error appears in the above-identified patent and that said Letters Patent is hereby corrected as shown below:

Column 12,
Line 39, "information" should be deleted.

Signed and Sealed this

Twentieth Day of December, 2005

JON W. DUDAS
*Director of the United States Patent and Trademark Office*